H. H. KOONS
SICKLE BAR.
APPLICATION FILED FEB. 7, 1917.

1,231,174.

Patented June 26, 1917.
2 SHEETS—SHEET 1.

Inventor
Helos H. Koons

By Lancaster and Allwine
his Attorneys

H. H. KOONS
SICKLE BAR.
APPLICATION FILED FEB. 7, 1917.
1,231,174.
Patented June 26, 1917.
2 SHEETS—SHEET 2.
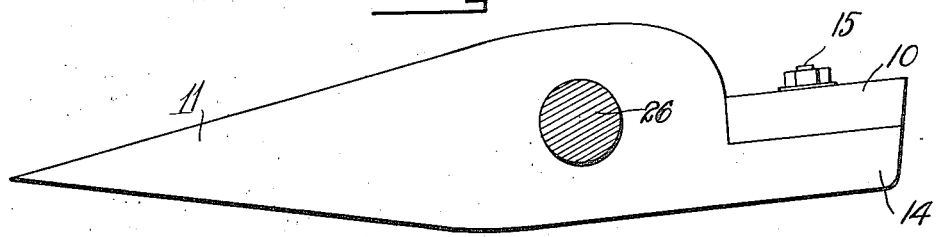
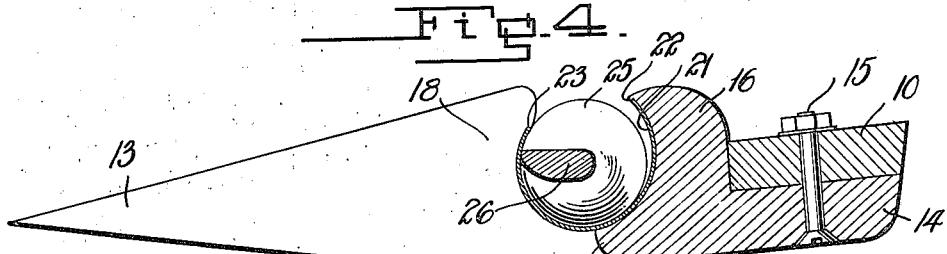
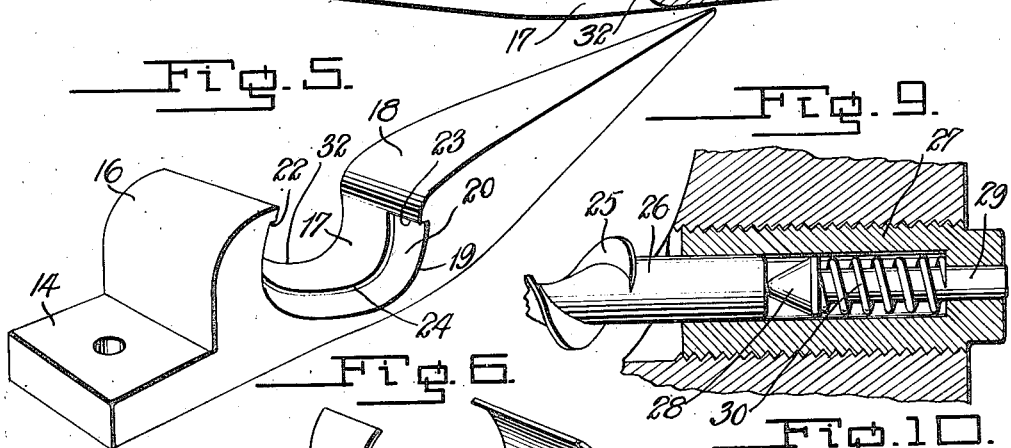
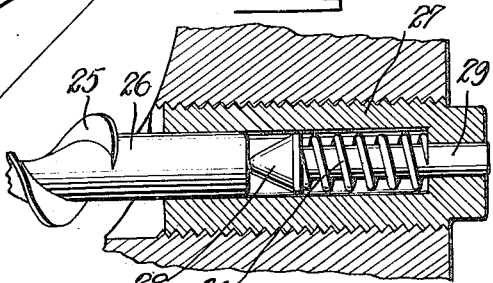
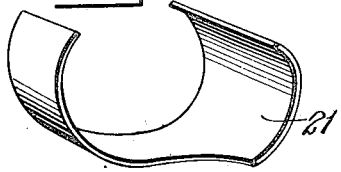
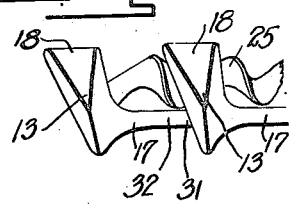
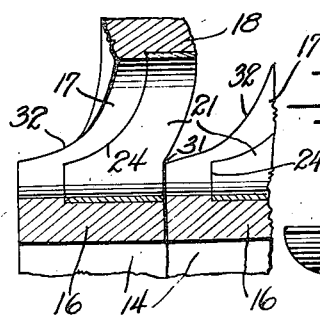
Inventor
Helos H. Koons

UNITED STATES PATENT OFFICE.

HELOS H. KOONS, OF NARKA, KANSAS.

SICKLE-BAR.

1,231,174.  Specification of Letters Patent.  Patented June 26, 1917.

Application filed February 7, 1917. Serial No. 147,206.

*To all whom it may concern:*

Be it known that I, HELOS H. KOONS, a citizen of the United States, and a resident of Narka, in the county of Washington and State of Kansas, have invented a certain new and useful Improvement in a Sickle-Bar, of which the following is a specification.

The present invention relates to sickle bars, particularly to that type which may be used in connection with mowing machines or the like, or which may be used independently thereof.

Among the objects of the present invention are to provide a sickle bar, of such construction that it may be employed for cutting grass, weeds and the like, when standing erect, or at an angle, or when lying flat on the ground; which is provided with a revolving cutter or spindle which requires no sharpening, and which runs noiselessly and without vibration; which has a revolving cutter adapted to be removed from the finger bar or supporting structure through the outer side thereof without the necessity of the operator getting in front of the machine or behind the horses; and which, on account of the single rotary motion of the cutter may be shifted in front of the mower so as to cut across the width of the same as is frequently required when operating the sickle bar in narrow places.

A further object of the present invention is to provide a sickle bar of this nature which has inclined fingers and fixed or shearing knives therefor so arranged as to entrap the blades of grass, or the like, in the throats of the cutter bar, and to thus insure the cutting of the grass, or the like.

A still further object of the present invention is to provide the sickle bar with fixed knives or shearing blades which may be detachably carried by the fingers, and which do not require rivets or the like for holding them in place.

A still further object of the present invention is to provide a peculiar mounting for the rotary sickle or cutter which relieves the same of jar incident to coming in contact with relatively hard stalks, or the like, to prevent injury to the rotary cutting blade.

The above, and various other objects and advantages of this invention will be in part described, and in part understood, from the following detailed description of the present preferred embodiment, the same being illustrated in the accompanying drawings wherein:

Fig. 3 is an inner side elevation of the sickle bar.

Fig. 4 is a transverse section taken through the sickle bar, through one of the throats thereof, showing the relative positions of the rotary cutter or sickle and the stationary shearing blade.

Fig. 5 is a detail perspective view of one of the guard fingers, the fixed knife being removed therefrom.

Fig. 6 is a detail perspective view of one of the fixed or shearing knives.

Fig. 7 is a horizontal sectional view taken substantially diametrically through the inner ends of a pair of adjacent guard fingers, showing the fixed blade held in position by the same.

Fig. 8 is a top plan view of one of the fixed blades.

Fig. 9 is a horizontal sectional view taken through the outer shoe, showing the spring mounting for the rotary cutter.

Fig. 10 is a front elevation of a pair of the guard fingers and a portion of the rotary cutter mounted therein.

Figure 1:
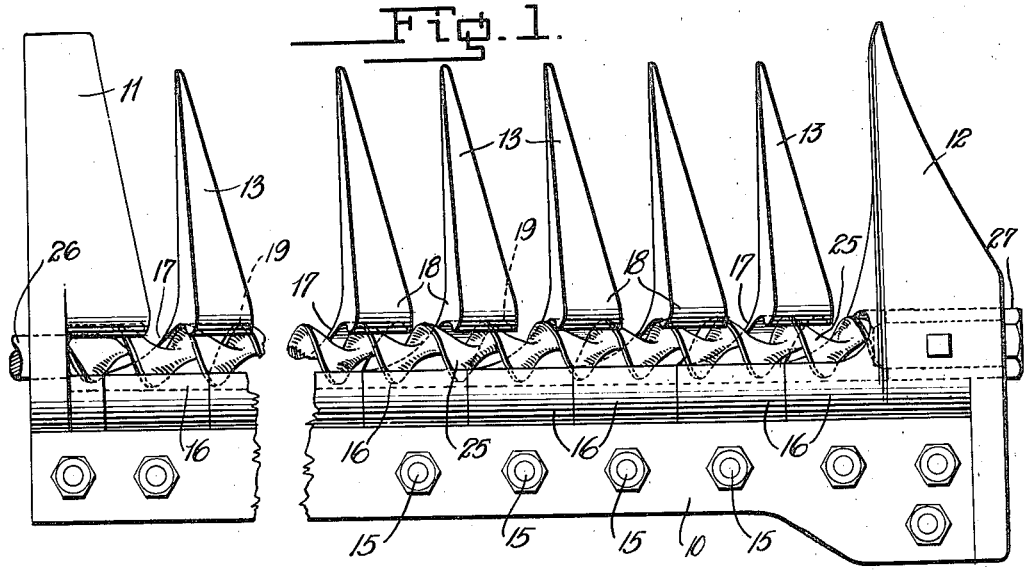
Figure 1 is a top plan view of a sickle bar constructed according to the present invention.

Referring to these drawings, wherein like parts are designated by similar numerals of reference throughout the several views, 10 designates a finger bar which is relatively flat, and provided at its opposite ends with forwardly extending inside and outside shoes 11 and 12.

A plurality of guard fingers 13 are carried by the finger bar 10 and are arranged in any desired number between the shoes 11 and 12. Each guard finger is provided at its inner end with a relatively flat shank portion 14 adapted for securement to the underside of the finger bar 10 by bolts 15, or the like, and is provided with a heel portion 16 which rises in front of the finger bar 10 and holds the guard finger from swaying laterally upon the finger bar. The lower face of the guard finger is preferably flat at its inner end, and the lower part of the heel 16 merges into a forwardly tapering neck 17 upon the outer end of which the finger point 18 is formed. The inner end of the finger point 18 has its upper face disposed in a horizontal plane above that of the upper face of the heel 16, and is offset laterally from the heel 16, toward the outside shoe 12. The finger point 18 tapers forwardly in the usual manner, and has its outside face, or that which faces the shoe 12, inclined inwardly and downwardly to provide a spiral inner edge 19 which merges into the adjacent end of the neck 17.

Figure 2:
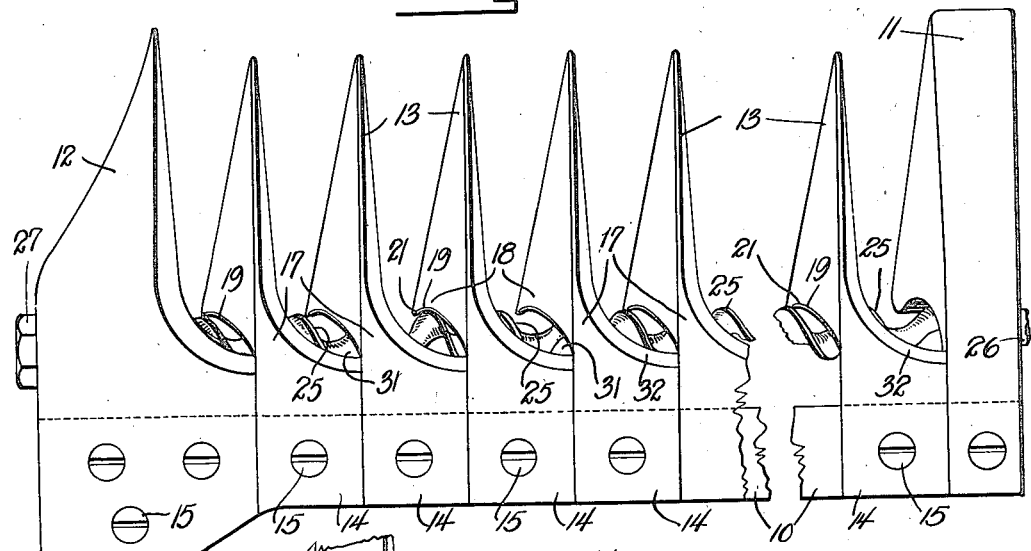
Fig. 2 is a bottom plan view of the same.
Figure 11:
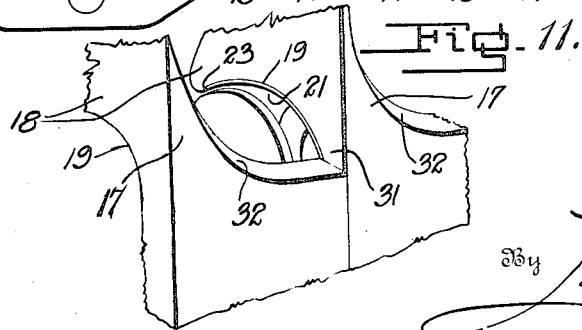
Fig. 11 is a fragmentary perspective view of the inner end of a pair of adjacent guard fingers, showing the bottoms thereof, and a cutter mounted therein.

The inside face of the finger point 18 is inclined downwardly and outwardly toward the shoe 11 at a less angle of inclination than the opposite face of the finger point, the latter terminating at its bottom in a substantially straight edge. These inner and outer faces of the finger point 18 are so inclined to provide, as shown in Figs. 1 and 2, forwardly diverging throats between the fingers to collect and bunch the stalks as they are fed inwardly toward the cutter bar. The body portion of the guard finger, composed of the heel 16, the neck 17, and the inner end of the finger point 18, is provided with a transversely extending substantially cylindrical opening or bore. The inner wall of the body portion of each guard finger is provided with a depression forming a seat or socket 20 which opens through the outer side of the guard finger, and which is adapted to receive therein the fixed or shearing blade 21. The opening in the guard finger opens through the top thereof, and the heel 16 and the finger point 18 are provided respectively with abutting shoulders 22 and 23 for engagement with the opposite ends of the blade 21 to hold it from turning circumferentially in the guard finger.

The fixed blade 21 is relatively wide at its base portion and is adapted to engage thereat in the heel 16 of the guard finger while the outer end of the blade 21 is reduced in width and is bent spirally from its base portion to conform to the neck 17 and the inner end of the finger 18. The outer edge of the blade 21 conforms to the substantially spirally-formed outer edge 19 of the neck 17 and the inner end of the finger point 18. The inner edge of the blade 21 is seated against an abutting shoulder 24 which is formed at the inner side of the socket or seat 20 to hold the outer edge of the blade flush with the outer edge of the neck 17. The blade 21 is held in position by the inner side of the next adjacent guard finger. As shown in Fig. 7, the next adjacent guard finger is provided with an inner surface which lies flush with the inner surface of the blade 21 and which thus forms a second shoulder against which the blade abuts to prevent the blade from displacement from the socket 20. The second guard finger, as shown in Fig. 7, also carries a second shearing blade 21 in the manner above described, the same being held in position by the next adjacent guard finger. By means of this arrangement and construction, each guard finger is provided with a fixed blade 21, and the blades 21 are held in place by the securement of the guard fingers in abutting relation to the finger bar 10.

The transverse openings formed in the inner ends of the guard fingers are brought into alinement when the fingers are secured to the bar 10, and provide a relatively long housing for a rotary or spiral cutter 25. The spiral cutter or blade 25 is formed upon a shaft 26 which has one end journaled to the inside shoe 11 and is adapted to be secured in any suitable manner to the operating mechanism for turning the spiral blade 25. The outer end of the shaft 26 projects into the outside shoe 12, and has bearing in a detachable bushing or sleeve 27 which is preferably threaded into the outer side of the shoe 12, and which slidably engages over the outer end of the shaft 26. A follower or centerer 28 is slidably mounted in the sleeve 27 and is provided with a centering point adapted for engagement with the outer extremity of the shaft 26 to center it in the sleeve and to provide a bearing therefor. The follower 28 is provided with a stem 29 which extends outwardly through the closed end of the sleeve 27, and which supports thereabout an expanding spring 30 engaging at one end with the follower 28 at its opposite end against the closed end of the sleeve 27. The outer end of the sleeve 27 may be enlarged and headed as shown for the reception of a wrench or the like by means of which the sleeve 27 may be removed and positioned with respect to the outside shoe 12. The transverse opening formed through the outside shoe 12 for the reception of the sleeve 27, is of such diameter that when the sleeve 27 is removed from the shoe 12, the shaft 26 with its spiral cutting blade 25 may be drawn longitudinally through the shoe 12 from the sickle bar.

The inner converging ends of the throats which are formed between the finger points 18, terminate in relatively narrow crotches 31 lying between the inside curved edges 32 of the spirally-formed neck 17, and the lower end of the spiral edge 19 formed on the inner end of the finger point 18. The pitch of the spiral cutting blade 25 is less than the pitch of the edge 19 and the adjacent edge of the blade 21 of each guard finger, so that during the rotation of the spiral cutting blade 25, the latter engages the edge 19 at the top of the finger 18 and gradually and consecutively engages the subjacent points of the fixed cutting blade 21 until the spiral cutting blade 25 finally crosses the crotch 31 and pinches and entraps the blades of grass and the like which have been fed into the throat of the sickle bar. The difference in pitch between the fixed blades 21 and the rotary blade 25 is such as to present the rotary blade 25 for contact with the upper ends of all of the fixed blades simultaneously, and to thus distribute the cutting and pinching pressure of the rotary blade throughout its length and prevent undue jar or vibration at any one side thereof. In other words, this difference in pitch between the fixed and rotary blades is such that the rotary blade is continuously cutting at some part of its length and the impact of the blade is not brought simultaneously at any one time during the turning thereof.

From the above description, the operation will be apparent for as the shaft 26 is revolved by any suitable mechanism, the spiral cutting blade 25 is rotated and caused to engage the spiral cutting edges of the fixed blades 21 at the upper ends of the latter, and to work downwardly thereover for entrapping weeds, and the like in the crotches or bights 31, thus insuring their cutting. When the guard fingers are secured to the finger bar 10, the inside edges of the guard fingers engage the outside edges of the adjacent base portions of the fixed blades, and thus anchor and securely hold the blades in their sockets 20. The shoulders 22 and 23 prevent the circumferential movement of the blades in the guard fingers, and no rivets, bolts or the like are required to secure the fixed blades in place.

The sleeve 27 may be unscrewed from the shoe 12 and withdrawn therefrom, the shaft 26 with its cutting blade 27 being then free to be withdrawn through the shoe 12 from the sickle bar. Thus, the rotary cutter may be withdrawn from the guard fingers without the necessity of getting in front of the machine, or behind the horses.

It is of course understood that various changes and modifications may be made in the above specifically described construction without departing from the spirit of this invention, and being restricted only by the scope of the following claims.

I claim:—

1. In a sickle bar, the combination of a plurality of guard fingers forming throats therebetween, a rotary spiral cutter traversing the inner ends of the throats, a fixed spiral blade arranged at the inner end of each throat inclining in the same direction as the blade of the rotary cutter and being of greater pitch than the rotary spiral blade, and means for turning said rotary cutter to move rearwardly at the lower side thereof.

2. In a sickle bar, the combination of a finger bar, a plurality of guard fingers secured in abutting relation to said finger bar, a plurality of fixed blades detachably engaging the finger bars and held in place therebetween, and a movable cutter adapted to traverse said fixed cutting blades.

3. In a sickle bar, the combination of a finger bar, a plurality of guard fingers detachably secured to said finger bar and arranged in abutting relation, said guard fingers being provided with transverse alining openings therethrough, and recesses in the lower walls of said openings adjacent to one edge of the finger bars and opening through said edge, blades detachably seated in said recesses, and having edges flush with said edges of the finger bars and adapted to abut the opposite edges of the finger bars when assembled to retain the blades in the recesses, and a movable cutter mounted in said alining openings of the finger bars to traverse said fixed blades.

4. In a sickle bar, the combination of a plurality of guard fingers, and means for securing said guard fingers detachably in laterally abutting relation, said guard fingers being provided with a transverse row of openings therethrough adapted to aline and provide a housing, a spiral cutter rotatably mounted in said housing, the upper portions of the finger points of said guard fingers being offset spirally forwardly and upwardly to overhang the throats between adjacent guard fingers and provide a relatively small bight at the inner end of each throat, said rotary spiral cutter being inclined to a greater degree than the necks of the guard fingers to initially engage the upper portions of the finger points and entrap grass and the like in the bights of the throats and insure the cutting of the grass.

5. In a sickle bar, the combination of a finger bar, inside and outside shoes secured to said finger bar, a row of guard fingers secured to the finger bar between said shoes, said outside shoe being provided with a transverse opening therethrough, a longitudinally shiftable cutter mounted transversely through said guard fingers and being journaled at its opposite ends in said shoes, a sleeve detachably mounted in said outside shoe and surrounding the outer end of said cutter bar, a follower in said sleeve, a spring in said sleeve engaging the follower to urge the same against said cutter bar to hold the same under tension and absorb shocks and vibration thereof, said transverse opening in the shoe being of sufficient size to permit the longitudinal removal of the cutter bar therethrough, and said sleeve normally retaining said cutter bar in operative position.

6. In a sickle bar, the combination of a finger bar, shoes secured to the opposite ends of said finger bar, a row of guard fingers secured to said finger bar between said shoes, said guard fingers and said shoes being provided with transverse registering openings therethrough, a rotary spiral blade journaled at its opposite ends to said shoes and adapted to turn in said openings of the finger bars, said guard fingers being provided at the inner ends of the finger points thereof with spiral cutting edges overhanging the bights of the throats of the sickle bar, and said spiral cutting blade facing said cutting edges of the fingers and being of a pitch less than that of said spiral cutting edges, and means for turning said rotary blade to move rearwardly at the lower side thereof.

7. In a sickle bar, the combination of a body part having a plurality of guard fingers with spiral cutting blades at their inner ends, a spiral cutter rotatably mounted in the body part and having a blade facing said blades of the guard fingers, and tension means engaging the end of the spiral cutter to yieldingly hold the blades thereof in position relatively to the blades of the guard fingers.

HELOS H. KOONS.